United States Patent [19]
Lowry et al.

[11] Patent Number: 5,893,680
[45] Date of Patent: Apr. 13, 1999

[54] VOLATILE CONTAMINANT EXTRACTION FROM SUBSURFACE APPARATUS AND METHOD

[76] Inventors: William Edward Lowry, 17 Valencia Loop; Sandra Dalvit Dunn, 267 Hyde Park Estates, both of Santa Fe, N.M. 87501

[21] Appl. No.: 08/837,499

[22] Filed: Apr. 14, 1997

Related U.S. Application Data

[60] Provisional application No. 60/015,438, Apr. 15, 1996.
[51] Int. Cl.$^6$ ........................................... B09C 1/00
[52] U.S. Cl. .................... 405/128; 405/270; 588/249
[58] Field of Search ................ 405/128, 129, 405/131, 270; 166/97.1, 369, 370; 588/249

[56] References Cited

U.S. PATENT DOCUMENTS

| | | | |
|---|---|---|---|
| 4,026,355 | 5/1977 | Johnson et al. | 166/246 |
| 4,442,901 | 4/1984 | Zison | 166/369 |
| 4,483,641 | 11/1984 | Stoll | 405/129 |
| 4,745,850 | 5/1988 | Bastian et al. | 405/128 X |
| 5,076,727 | 12/1991 | Johnson et al. | 405/128 |
| 5,106,232 | 4/1992 | Metzer et al. | 405/128 |
| 5,120,160 | 6/1992 | Schwengel | 405/128 |
| 5,206,067 | 4/1993 | Bonzo | 405/129 X |
| 5,209,604 | 5/1993 | Chou | 405/128 |
| 5,213,445 | 5/1993 | Ikenberry et al. | 405/128 |
| 5,221,159 | 6/1993 | Billings et al. | 405/128 |
| 5,244,310 | 9/1993 | Johnson | 405/128 |
| 5,249,888 | 10/1993 | Braithwaite et al. | 405/128 |
| 5,271,693 | 12/1993 | Johnson et al. | 405/128 |
| 5,288,169 | 2/1994 | Neeper | 405/128 |
| 5,445,474 | 8/1995 | Lundegard et al. | 405/128 |
| 5,601,382 | 2/1997 | Corte | 405/128 |
| 5,611,402 | 3/1997 | Welsh | 166/369 |
| 5,641,245 | 6/1997 | Pemberton et al. | 405/128 |
| 5,697,437 | 12/1997 | Weidner et al. | 166/52 |

OTHER PUBLICATIONS

Contributions in Our Knowledge of the Aeration of Soils, E. Buckingham, U.S. Department of Agriculture Bureau of Soils Bulletin #25, 1904.

*Primary Examiner*—George Suchfield
*Attorney, Agent, or Firm*—Kevin Lynn Wildenstein, Esq.

[57] ABSTRACT

The present invention is a soil remediation system which uses naturally occurring barometric pressure oscillations to remediate volatile contamination in the vadose zone. By applying a surface seal, a collection plenum and a unidirectional gas relief valve to the soil surface above the contaminant plume, the present invention induces a net upward soil gas velocity in the contaminated soil. The sinusoidal velocity of the soil gas is rectified by the present invention to eliminate or minimize its downward velocity component and allow a normal upward velocity component. The resulting net upward velocity sweeps contaminant vapors from the source, releasing them up to the atmosphere through the gas relief valve in small concentrations. This process is regular and steady, and is accomplished without the use of ground bore holes, off-gas treatment or onsite power. Consequently, it is a low cost remediation system applicable to surface contamination above the vadose zone such as may be found in leaking buried pipes, surface spills, buried waste containers, and shallow landfills.

28 Claims, 7 Drawing Sheets

VOLATILE CONTAMINANT EXTRACTION FROM SUBSURFACE APPARATUS AND METHOD

This application claims benefit of provisional application Ser. No. 60/015,438 filed Apr. 15, 1996.

FIELD OF THE INVENTION

This invention relates to an apparatus and method to precipitate vertical displacement of contaminated gas trapped within the earthen soil. The present invention non-invasively controls the displacement of soil gas using atmospheric above-surface barometric pressure features which both impede the downward movement of subsurface gas vapors and allows upward movement of subsurface gas vapors. The present invention includes a surface seal, a plenum, and an extraction vent valve. The present invention offers a continuous, natural, and inexpensive method to remediate volatile organic contaminated plumes in the subsurface vadose zone. The present invention is a remediation solution which serves as an in-situ containment and extraction methodology for sites where most or all of the contamination resides in the vadose zone soil, and enhances advective soil gas movement resulting from barometric pressure oscillations.

BACKGROUND OF THE INVENTION

Records of the effects of atmospheric pressure fluctuations on subsurface gas date back to early observations of weather patterns. The flow of air throughout cave entrances, particularly during rapid barometric pressure changes, are recorded throughout the world. The atmospheric pressure effect and its implications for gas transport is mentioned in a 1904 monograph describing the release of carbonic acid from soil and its replacement with oxygen from the subsurface in response to atmospheric pressure changes. See E. Buckingham, *Contributions in Our Knowledge of the Aeration of Soils*, U.S. Department of Agriculture Bureau of Soils Bulletin. This monograph describes a soil cleaning effect that occurs because of barometric changes and suggests that the response of subsurface air pressure changes are damped and time delayed with respect to surface pressure changes. The monograph further suggests that the amount of damping and delay increases with further depth into the soil.

From a study of atmospheric pressure, it is known that oscillations in barometric pressure are naturally periodic and sinusoidal in nature. Such oscillations are also diurnal, resulting from both daily temperature changes in the earth's atmosphere and the passage of weather fronts. Daily pressure variations resulting from temperature changes average about 5 millibars (one millibar is approximately one thousandth of an atmosphere), while those due to weather front passages can be 25 or more millibars.

As the barometric pressure rises (such as on a downward oscillatory cycle), a gradient is imposed on the earthen soil gas which drives fresh surface air into the near surface of the soil. As the pressure drops (such as on an upward oscillatory cycle), soil gas very near the soil surface vents upward from the surface into the atmosphere. This cyclic phenomena is observable with perforated wells which are formed in the ground through bore holes. Such wells are observed to "breathe" in that they inhale ambient air from the surface and exhale soil gas during cyclic barometric pressure changes. This well "breathing" results primarily from pressure differentials that occur between the soil air pressure near the open end of a well and the surrounding atmospheric barometric pressure.

Gas trapped in the earthen soil is capable of movement in the soil under several conditions. The total movement of soil gas in the earthen soil depends primarily on the magnitude and frequency of the barometric pressure oscillations, the soil gas permeability and the depth (or distance) to an impermeable boundary. Such an impermeable boundary can include a localized water table, bedrock or extensive layers of low permeability material (such as caliche or clay). Since the daily change in atmospheric pressure is small (typically 0.5 percent), the overall net soil gas displacement during the daily cycle is also small (with an estimated range of centimeters to meters). Furthermore, the daily oscillations in atmospheric pressure always return to a mean value. Therefore, over a period of time, no significant net soil gas displacement occurs in the subsurface due to advective forces alone.

The dominant characteristic defining the magnitude and frequency of soil gas movement is due to the approximately 5 millibar variation which results daily from heating and cooling of the atmosphere. In higher permeable soil, the gas velocities will be greater for a given atmospheric pressure variation. Peak gas velocity also increases as the depth to an impermeable layer increases. The peak soil gas velocity, as determined by analytically modeling the soil gas response, will range from 0.2 to 0.8 meters/day for a typical range in permeability (1 to 10 Darcies) and depths to an impermeable layer of 50 meters or more. Under natural conditions, this oscillatory movement results in no net flow because it always returns to its mean value.

Soil gas movement is also triggered by composition of the source contaminant. For example, volatile contamination sources typically exist as liquid deposits in the soil. The liquid evaporates and results in an initial vapor concentration in the air immediately adjacent to the liquid. Contaminant vapor diffuses away from the contaminant source at a rate governed by the diffusion constant of the contaminant in soil gas, the porosity of the soil, the soil tortuosity (deviation from a straight line path through the soil pores), absorption of the contaminant into the soil, the ability of the adjacent soil to supply adequate thermal energy to vaporize the liquid contaminant and other related effects. Under these situations, analysis of soil gas diffusion is analogous to heat transfer, where gas concentration is substituted for temperature and an effective soil diffusivity is substituted for the heat transfer constant.

The diffusion of soil gas is also caused by density of the contaminant which might be sufficient to drive the gas vapors towards the water table. Such "density induced" transport of soil gas are induced by temperature and contaminant concentration gradients in the soil gas. An effective remediation system must counteract these forces.

While there are numerous strategies for removing soil gas contaminants from the earthen soil, two techniques receive the most attention: active vapor extraction and passive vapor extraction.

Active vapor extraction involves withdrawing soil gas from contaminated areas of the vadose zone and then treated for removal of volatile organic compounds ("VOCs"). Unlike passive vapor extraction, however, active vapor extraction techniques require the disturbance of the earthen soil, such as digging or boring a well into the subsurface soil. These bore hole wells typically employ a blower, compressor and/or a vacuum device in an attempt to remove contaminated vapor from the well site to the surface for treatment and/or discharge. The typical active vapor extraction system also includes a water knockout tank to remove entrained water, an air cooler to reduce the temperature of the gas stream temperature downstream of the blower, canisters for absorption of VOCs, and a process control system. Typically, active vapor extraction techniques rely on horizontal transport of subterranean gas into the well, which is then vented out vertically within the well by the assistance of the blower and/or vacuum device. These techniques are featured in U.S. Pat. Nos. 5,288,169 to Neeper, 5,271,693 to Johnson et al, 5,076,727 to Johnson et al, and U.S. Pat. No. 5,249,888 to Braithwaite et al. Another example of removing contaminated soil gas from the ground involves the application of heat in the soil by injecting heated posts into the ground, again illustrating disturbance of the soil. These techniques are illustrated in U.S. Pat. Nos. 5,209,604 to Chou and 5,244,310 to Johnson.

Sites having a high concentration of contamination are perfect candidates for active vapor extraction. Active vapor extraction could be used to extract soil gas from areas of high volatile organic compound ("VOC") concentrations and within zones exhibiting high vapor phase permeability. However, for many other sites, residual contamination exists which could not practically or completely be removed by the active vapor extraction technology. These circumstances result in sites which are slightly contaminated, but by state and federal regulation, the contamination must still be monitored, controlled and/or removed.

Further, while active vapor extraction techniques may achieve partial or complete removal of contaminated soil gas quickly, they are also very expensive. In contrast, passive vapor extraction systems are useful for applications not requiring immediate attention and cheaper solutions. For example, a majority of Department of Energy sites are contaminated with VOCs. In many instances, the contamination has not reached the local water table, does not pose an immediate health hazard and therefore, is not considered a high priority problem. Nevertheless, these sites will ultimately require remediation of some type. Precipitating or enhancing the natural breathing process creates the potential for increased removal rates of VOCs from the vadose zone.

Passive vapor extraction technology, such as disclosed in the present invention, exploits the natural flow of air through the subsurface as a means of mobilizing volatile contaminants in the vadose zone toward collection points at the surface for treatment. The flow of air through the subsurface is primarily a function of the difference between the barometric pressure, the air pressure in the soil and the permeability of the soil. The permeability of the soil controls the rate at which air flows into and from the soil. Low permeability soils will exhibit low flow rates and require a longer period of time to equilibrate with a change in barometric pressure. Changes in soil depth and stratigraphy also affect pressure differences and flow rates.

Passive vapor extraction appears viable as a technology that can complement active vapor extraction under certain conditions. While active vapor extraction is useful to extract soil gas from areas of high VOC concentration and within zones exhibiting high vapor phase permeability, passive vapor extraction is useful in areas of lower VOC concentration and in relatively impermeable soils where extraction rates are limited by gaseous diffusion. A primary advantage of passive vapor extraction is lower capital and operating costs. The low cost of passive vapor extraction allows for many small passive vapor extraction systems to be installed on individual wells within a contaminated site and to be operated for extended periods of time. This allows for remediation of sites in which soil-gas transport is limited by diffusion.

Accordingly, it is an object of the present invention to provide a passive noninvasive soil remediation apparatus and method which uses an impermeable surface seal and unidirectional venting features to rectify and remediate volatile organic compound contaminated soils in the vadose zone of earthen soil.

It is an object of the present invention to provide a noninvasive soil remediation method and apparatus of maximized geometric configuration over a predetermined area to precipitate and enhance vertical displacement of soil gas in the subterranean soil.

It is an object of the present invention to provide a noninvasive soil remediation method and apparatus of a certain plenum size, buffer zone configuration, plume depth, and geologic setting (depth to impermeable zone) specifically adapted to displace soil gas in a preferred coordinate direction.

It is a further object of the present invention to provide a noninvasive soil remediation method for controlling displacement of soil gas within the earthen subsurface which impedes and minimizes downward movement of such gas or atmospheric air and stimulates upward gas movement.

It is also an object of the present invention to provide a noninvasive soil remediation method and apparatus including a surface seal, a plenum and an extraction vent valve placed above a contaminated soil gas plume and adapted to rectify soil gas displacement from traveling in a downward direction from the soil surface, and allowing such gas to travel in an upward direction.

It is also an object of the present invention to provide a soil remediation method and apparatus and method capable of rectifying soil gas displacement from traveling in a downward direction from the soil surface during periods of rising atmospheric pressure, and allowing such gas to travel in an upward direction during periods of atmospheric barometric pressure.

SUMMARY OF THE INVENTION

The present invention is a soil remediation system which uses naturally occurring barometric pressure oscillations to remediate volatile contamination in the vadose zone. By applying a surface seal, a collection plenum and a unidirectional gas relief valve to the soil surface above the contaminant plume, the present invention controls soil gas velocity in the contaminated soil. As seen in FIG. 1, the sinusoidal velocity of the soil gas is rectified to eliminate or minimize its downward velocity component and allow a normal upward velocity component. The resulting net upward velocity sweeps contaminant vapors from the source, releasing them up to the atmosphere in small concentrations. This process is regular and steady, and is accomplished without the use of bore holes, off-gas treatment, or site power. Consequently, the present invention is a low cost remediation system, applicable to near surface contamination such as leaking buried pipes, surface spills, buried waste containers and shallow landfills.

For this system to be practical and cost-effective, it must ensure that most or all of the contaminants evaporating and diffusing from a liquid source in the soil are swept upward. The opposing mechanisms that must be overcome are the diffusion of vapors downward from the source and density driven downward flow caused by thermal and contaminant concentration gradients in the soil gas.

DESCRIPTION OF THE PREFERRED EMBODIMENTS

Figure 1:
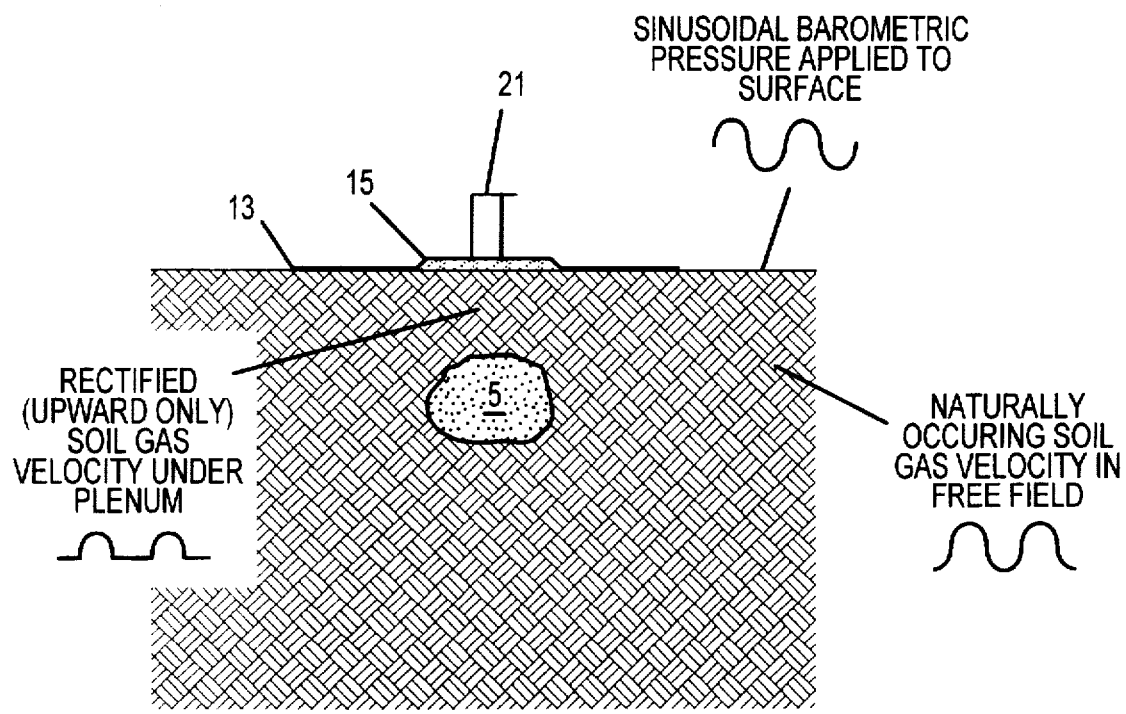
FIG. 1 illustrates the sinusoidal relationship between soil gas and barometric pressure above the earthen surface, below the earthen surface and at a point above a contaminant plume.
Figure 2:
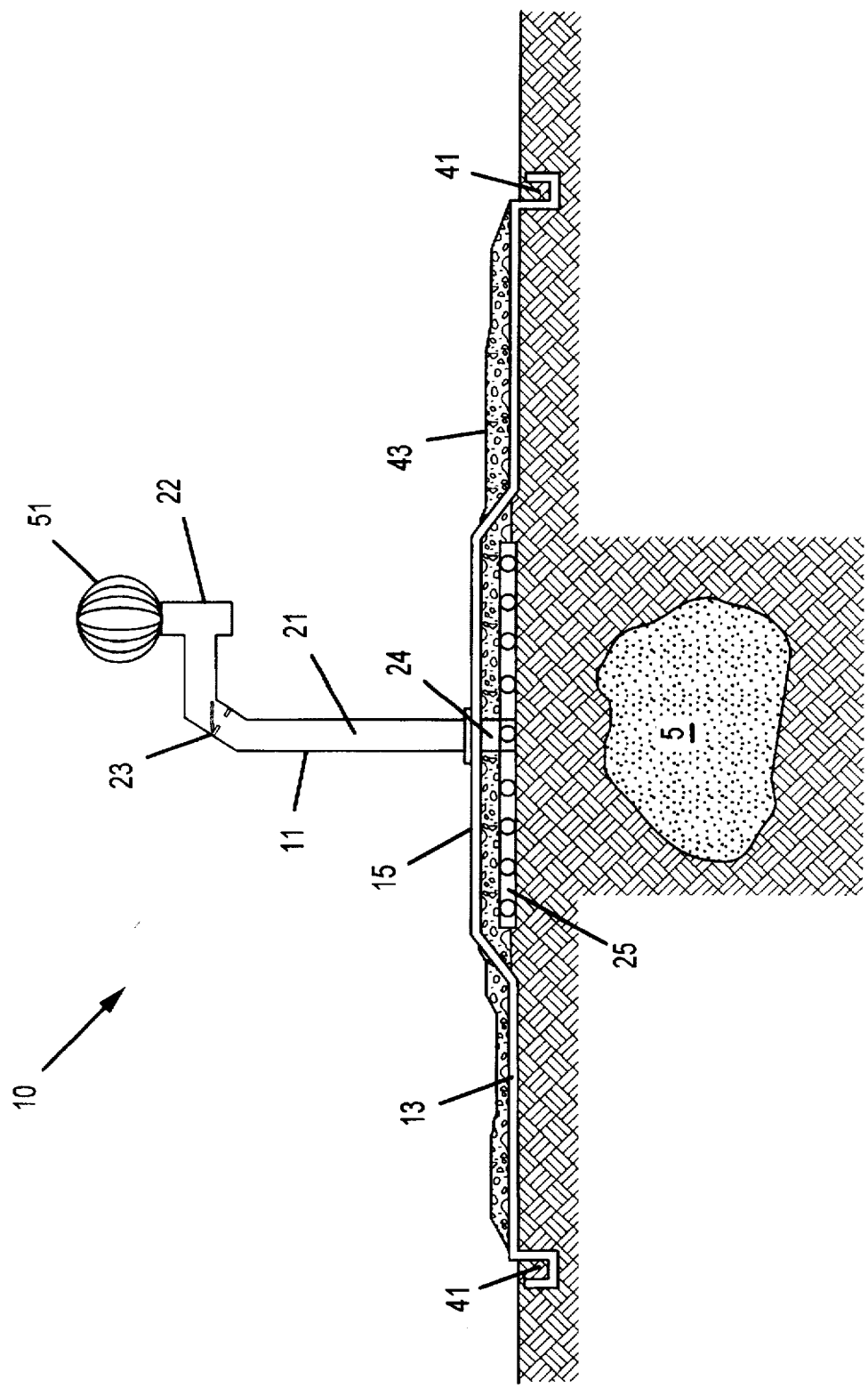
FIG. 2 is a cross sectional illustration of the present invention when adjacent to a contaminated source or plume.

The passive soil remediation apparatus 10 of the present invention, as shown in FIG. 2, consists of vent assembly 11, surface seal 13 and collection plenum 15.

Figure 3:
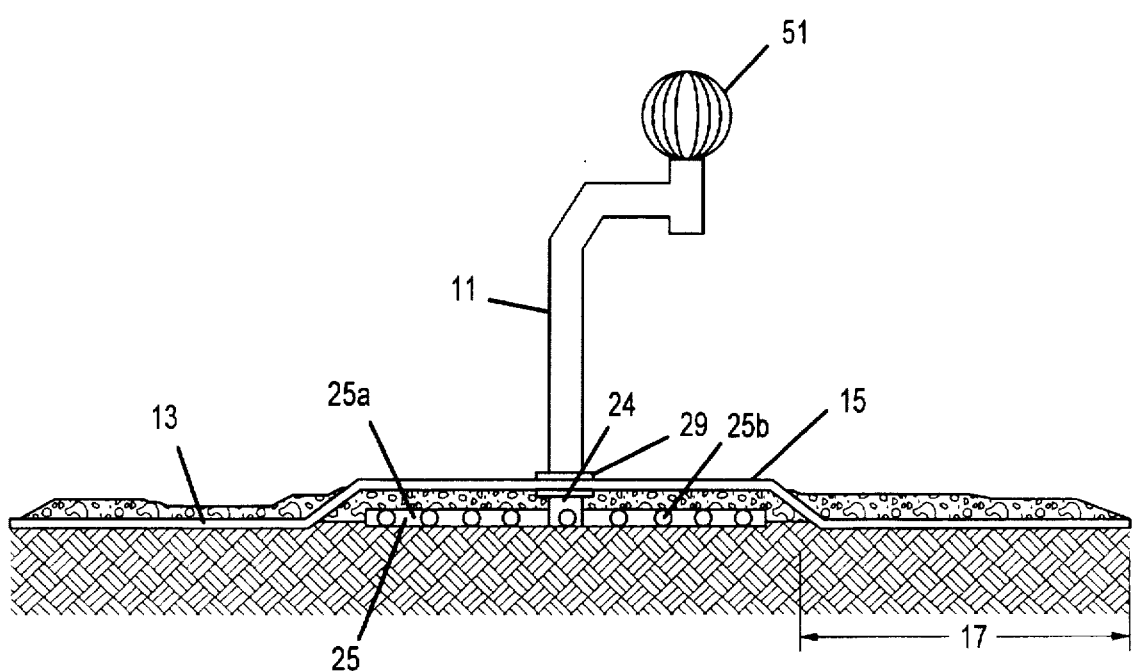
FIG. 3 illustrates a cross section of the present invention.

As seen in FIGS. 2 and 3, vent assembly 11 includes vent pipe 21, means for unidirectionally releasing soil gas 23 adjacent to one end 22 of pipe, and base 25 adjacent to second end 24 of pipe 21.

Figure 4:
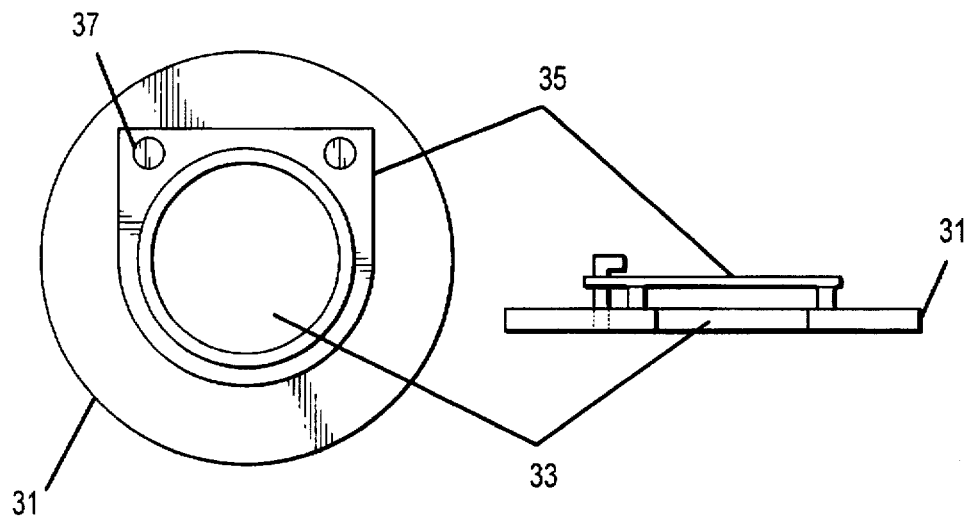
FIG. 4 illustrates the preferred check valve of the present invention.

Means for unidirectionally releasing soil gas 23 is a check valve. Check valve 23 is designed to prevent inflow of air that otherwise would dilute the soil gas and make its subsequent extraction less efficient. Therefore, in a preferable mode, check valve 23 is unidirectional in that it only operates to release soil gas from within plenum 15 in a single direction into the atmosphere. Check valve 23 is required to prevent the inward flow of ambient air that would tend to dilute the soil gas VOC concentration in the collection plenum. The use of check valve 23 increases the average VOC concentration around the well and the average VOC concentration of the extracted soil gas. As seen in FIG. 4, check valve 23 includes lightweight frame 31 having aperture 33 formed therein and being attached to interior wall 21a of vent pipe 21, and further including vent check valve flap 35 hinged to frame 31 by at least one pin 37 to thereby cover aperture 33. Vent check valve 23 is preferably constructed of mylar or durable similar material. Vent check valve 23 and frame 31 are optimally designed to be a very low differential pressure relief valve which preferably releases soil gas at overpressures less than 0.1 millibars, yet provides little to no backpressure when open. Thus, vent check valve 23 operates at a minimal differential pressure while maintaining a gas-tight seal when no pressure differential exists in the collection plenum and further, only allows gas flow in one direction during periods of decreasing atmospheric pressure.

Figure 4A:
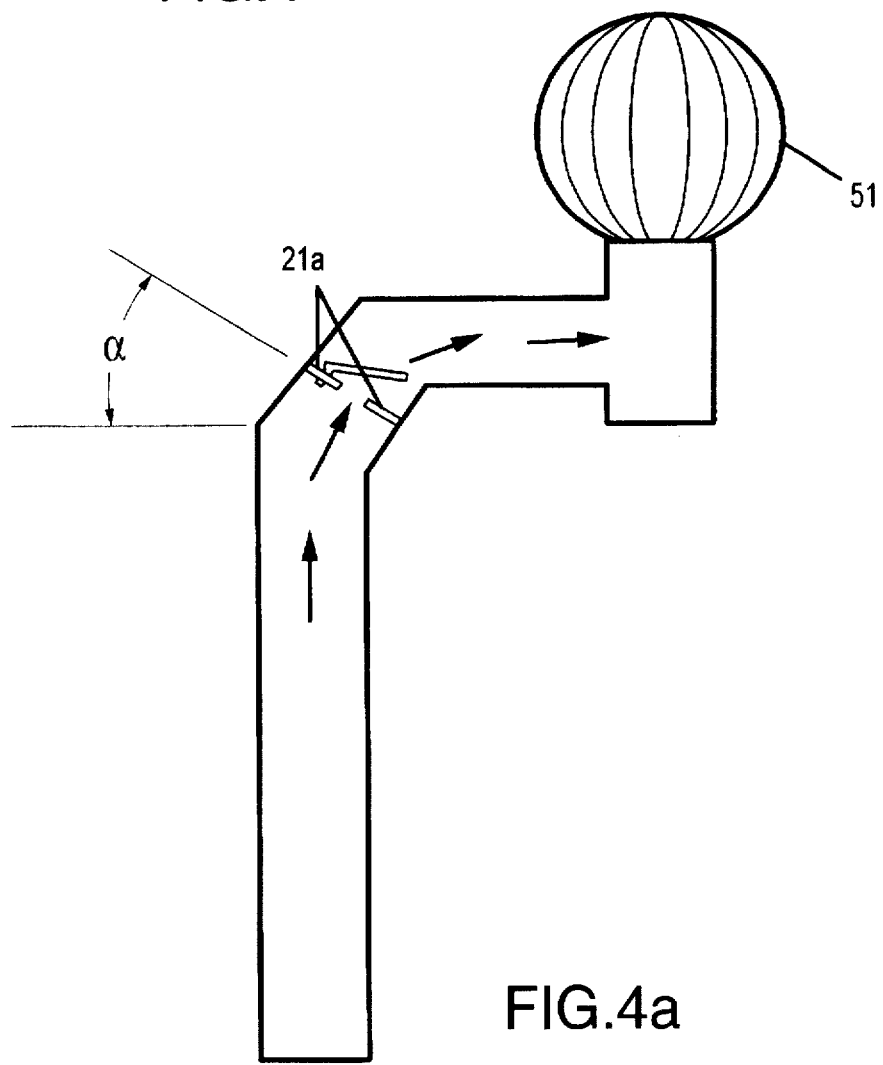
FIG. 4a is a cross sectional illustration of the air flow through the vent pipe of the present invention during a decreasing atmospheric pressure condition.

As seen in FIG. 4a, vent assembly 11 is optimally designed to allow one-way outward (exhaling) gas flow from collection plenum 15. Vent assembly 11 is also designed to vent such soil gas high enough into the atmosphere to allow the atmosphere rapidly disperse the contaminants.

Figure 5:
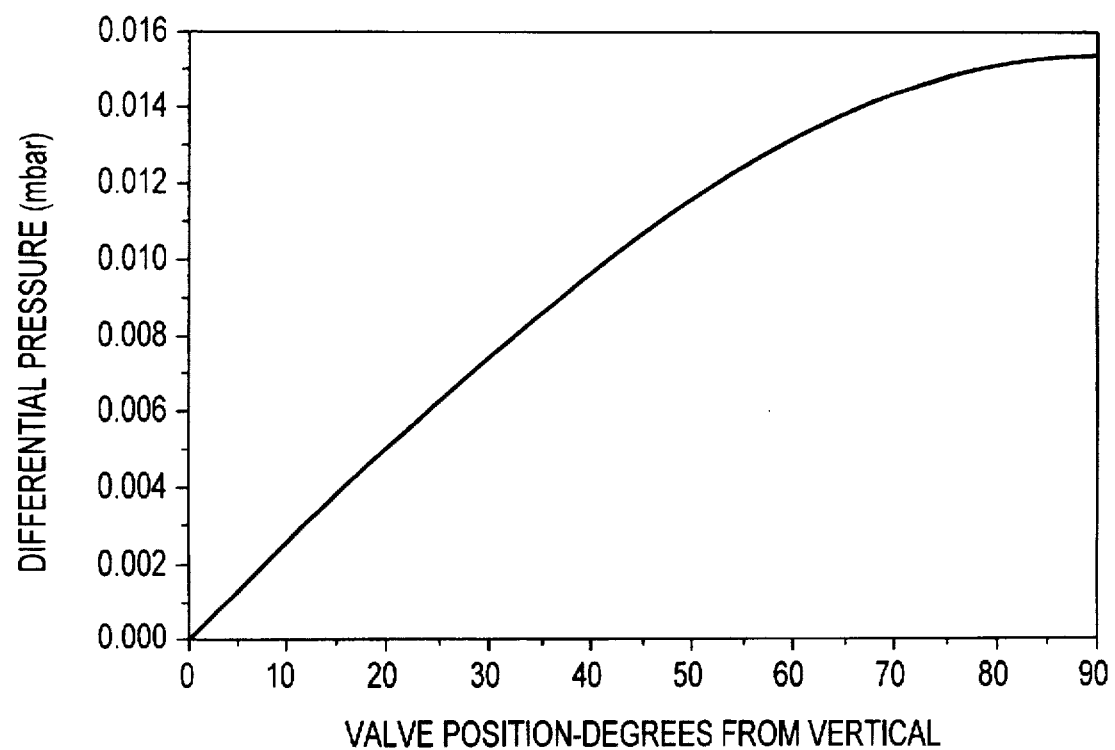
FIG. 5 is a graph depicting the amount of pressure differential required to operate the check valve of the present invention for a particular thickness of mylar material.

As seen in FIGS. 4 and 4a, check valve frame 31 is securely attached within pipe surface 21a slightly off vertical at a predetermined mounting angle α degrees. Mounting angle α is selected so that vent valve 23 opens at a specified differential pressure, which is preferably the minimum pressure differential expected to exist between plenum 15 and the soil outside the buffer zone (identified as 17 in FIG. 3). FIG. 5 depicts an illustrative pressure differential to open check valve 23 at pressures less than 0.1 millibars. The check valve design is optimized to allow sufficient overpressure build up within plenum 15 to maintain stable overflow. As those of skill in the art will appreciate, the operation of vent check valve 23 is dependant upon the mass of the vent valve and the angle α.

As seen in FIG. 3, base 25 includes at least one leg 25a extending outwardly from base 25 to provide foundational support for vent pipe assembly 11. Leg 25a is in gas flow communication with the interior of vent pipe 21, leg 25a having at least one inlet 25b and interior channel (not shown) formed therein to assist in the capture of soil gas residing in the collection plenum. Preferrably, base 25 includes a plurality of legs formed in a pattern to support vent pipe 21, the plurality of legs being perforated with apertures so as to be in gas flow communication with the interior of vent pipe 21.

Directly above contaminant plume 5, but below surface seal 13, is deposited collection plenum 15. Collection plenum 15 is composed of a layer of highly gas permeable material relative to the soil below, such as pea gravel, which forms a collection area for the upward-moving soil gas. As such, the preferable permeability of plenum 15 is at least 100 times greater than the permeability of the soil directly below. Plenum 15 is gas-flow connected to above-ground atmospheric pressure through a high volume vent valve 23, open only when soil gas is moving upward (during a drop in the barometric pressure). Plenum 15 serves as a collection manifold for upward-flowing soil gas during the natural exhaling cycle of soil gas as described previously. Because the contaminant plume can diffuse laterally outward from the source, the collection plenum is ideally sized to be twice the effective radius of the source contaminant, but can be sized smaller, to capture a substantial amount of contaminated soil gas and to cause the soil gas to flow towards vent assembly 11. Ideally, plenum 15 is adapted to minimize any damage to surface seal 13 and is generally six to twelve inches thick.

Figure 6:
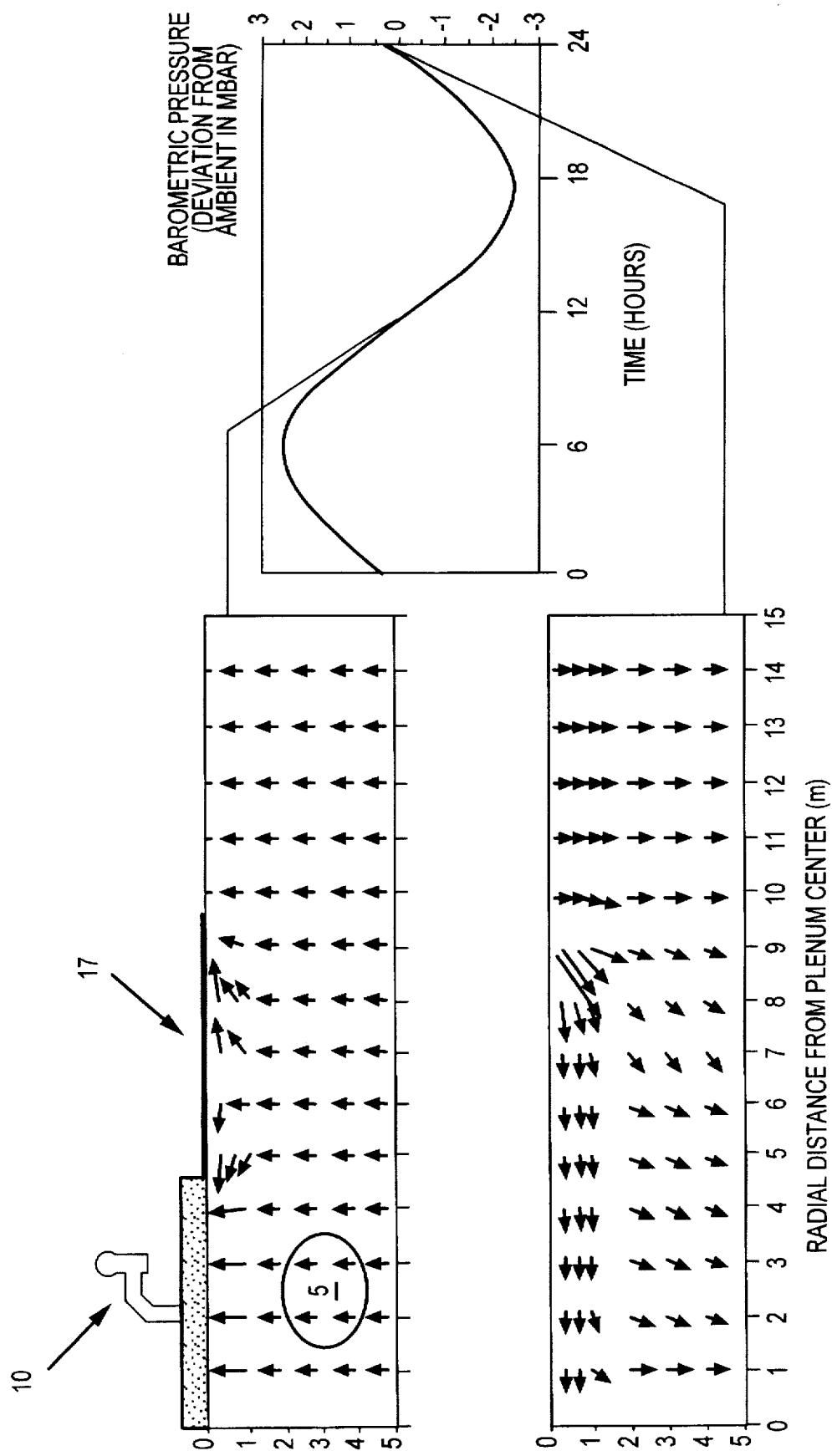
FIG. 6 is a graphical representation of soil gas flow over a twenty-four (24) hour period as the present invention is employed over twenty-four hours.

Surface seal 13 is deposited outward from collection plenum 15 directly on the soil surface to form a buffer zone (shown generally as 17 in FIG. 3) which controls the radial movement of air flowing into the soil during high atmospheric pressure periods. Surface seal 13 is designed to contain soil gas vapors (as seen in FIG. 6) in a plenum region 5 to prevent flow into or out of vapors in the buffer zone 17. Surface seal 13 is an impermeable, rugged and pliable material (such as a geotechnical membrane composed of polyethylene or synthetic rubber) which is flexible, malleable, formable, durable, inexpensive, and resistant to chemical and ultraviolet degradation. Surface seal 13 forms a no-flow boundary between the subsurface soil and the ground surface. Preferably, surface seal 13 is a continuous, nonporous sheet covering both buffer zone 17 and plenum volume 5, and is also resistant to soil moisture, organic degradation and radiation degradation. Surface seal 13 is attached securely adjacent to a base of vent pipe 11 by flanges 29 to prevent gas leakage and to form a gastight seal.

Optionally, shallow anchor trench 41 can be dug near the periphery of the surface seal 13 to minimize damage to the seal from abrasion, exposure to the elements and/or plant/animal intrusion. After trench 41 is dug and surface seal 13 placed on the ground surface, a shallow retention layer of pea gravel 43 (as seen in FIG. 2) can then be placed into trench 41 (over surface seal 13) to assure that surface seal 13 has a leak-tight seal with the ground surface.

Buffer zone 17 is defined as the subsurface soil area between an outer edge of seal 13 and a border of collection plenum 15. With this definition, buffer zone 17 effects the depth of influence of the present invention. Buffer zone 17 is also designed to resist rapid lateral inflow of atmospheric air. Preferably, buffer zone 17 is designed so that its radius extends out twice as much as the collection plenum's 15 radius. Also, preferably, the area defined by the buffer zone and the collection plenum is the predetermined area desired for soil remediation.

Figure 7:
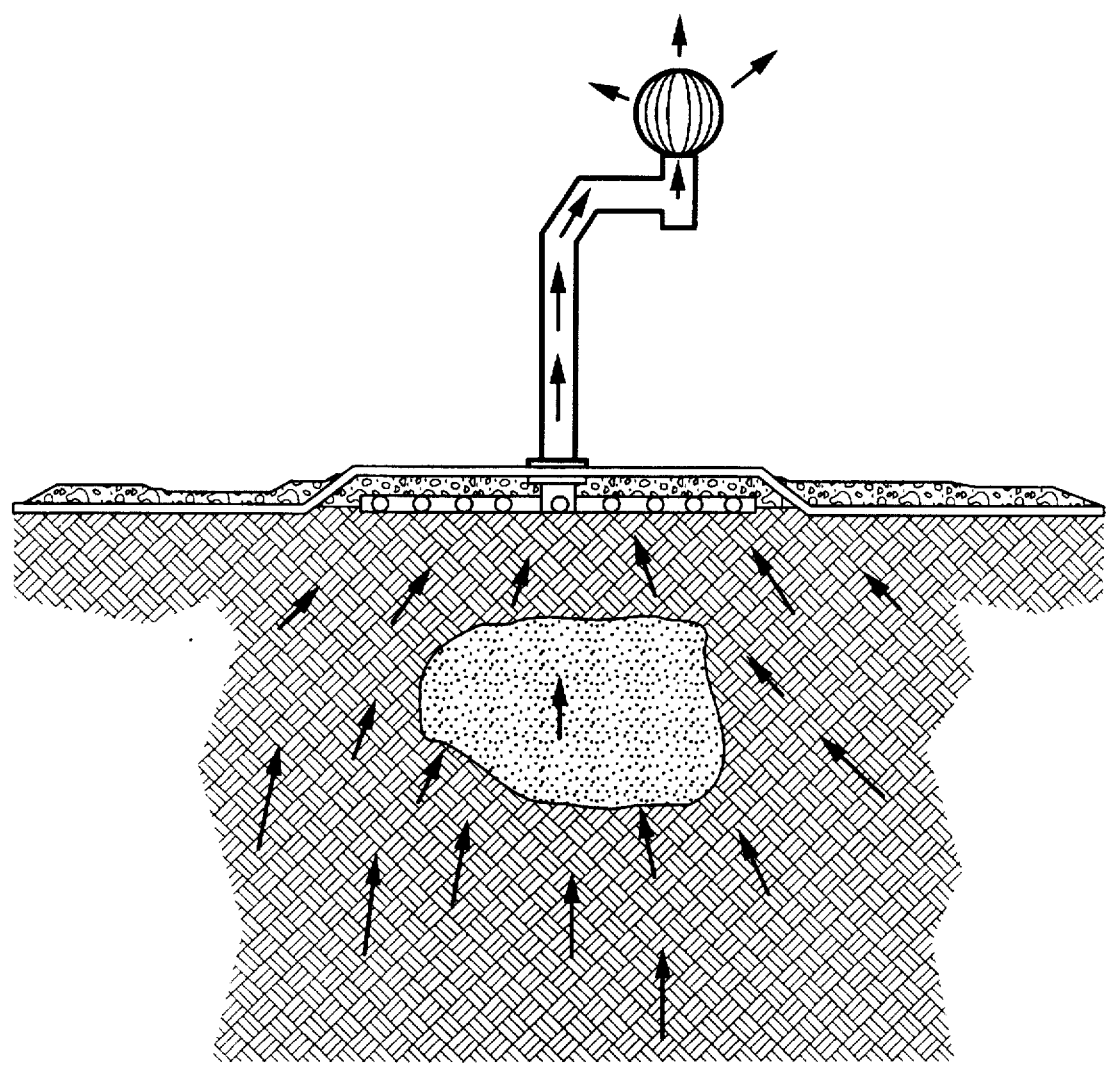
FIG. 7 is a cross sectional view of the present invention illustrating the net effect of the present invention over an extended period of time.

In operation, the present invention (seal 13, collection plenum 15 and vent assembly 11) continuously rectifies the sinusoidal soil gas velocity by minimizing the downward component. As seen generally in FIG. 7, this results in net upward soil gas flow over time, which is at a maximum just beneath the plenum. The maximum attainable (average) soil gas flux at the surface ranges from 0.03 to 0.07 $m^3/m^2$-day. For a 10 m diameter plenum, this yields a total soil gas extraction rate of 2.3 to 5.5 $m^3$/day.

High pressure periods result in restricted downward gas movement because vent valve 23 is closed and soil gas flows around the plume. When the atmospheric pressure is lower than the soil gas pressure at depth, soil gas flows upward and the surface seal 13 forces the contaminated gas into the plenum, where the opened vent valve exhausts it to the atmosphere.

To determine the effects of possible field conditions, the present invention was analyzed with a transient multidimensional numerical code to predict the system's performance. The numerical simulation demonstrated that at the soil surface, the system results in a net upward flow equal to the maximum attainable rectified flux. The flow rates predicted numerically were compared with processes which would transport contaminants downward toward the water table.

The present invention is useful for remediation of volatile contamination from sources such as leaking underground storage tanks, buried pipelines, surface spills, and landfills in the vadose zone. The process is slow but steady and continuous, and may take several years to adequately remediate a site. Its depth of influence is adequate to treat most circumstances. The system is inexpensive, requires virtually no maintenance, and can treat many of the sites in which no immediate threat to the water table exists. Installations can be unobtrusive: parking lots and concrete pads can actually form surface seal 13 while allowing the surrounding land to be used for other purposes.

Alternatively, a wind-powered turbine fan 51 (as seen in FIGS. 2–4) can be attached to vent pipe 21. Conventional turbine ventilator fans are inexpensive devices used to increase circulation in large open volumes such as attics and warehouses. They are usually located on the top of a roof so they are exposed to winds, which induce drag on the turbine vanes and cause them to rotate. The vanes are shaped such that when they are rotating, they pull air up out of the ventilated volument below. In the alternate embodiment, vent assembly 11 includes wind turbine 51 to enhance extraction rates on windy days. The use of turbine fan 51 uses the natural above-ground surface winds to increase the vacuum within plenum 5. While wind speed is dependant upon atmospheric pressure and temperature, it is most relevant to barometric pumping because features can be added to the surface seal 13 to enhance the vertical displacement of soil gas. Wind speeds typically peak in the afternoon and early evening, which corresponds to the time when the earthen soil is exhaling the most soil gas due to the drop in barometric pressure. The same atmospheric temperature rise that drops barometric pressure also results in increased wind speeds.

As seen in FIGS. 2–4, turbine 51 is placed on vent pipe 21. Because drawing air out of the ground results in far more resistance to flow than is normally experienced in building ventilation, turbine 51 will not be able to move much air as specified for a normal application. However, it is capable of imposing a vacuum on the plenum to enhance the extraction of soil gas. Natural pressure gradients in the soil beneath the surface due to barometric pressure oscillations were tested to be approximately 0.02 millibar/meter. Adding a vacuum of 0.5 millibar immediately at the surface results in an order of magnitude greater outflow at the surface during peak wind speeds.

Further, heating the soil gas collected in the plenum will also reduce its density and induce an upward buoyancy force similar to how a chimney works. Therefore, an optional transparent cover (not shown) can be placed over plenum region 5 to heat the extracted air with solar radiation to enhance the extraction vacuum (similar to a chimney effect) to cause an upward flow of earthen soil gas from the plenum towards the plenum material. It is also advantageous to leave the plenum cover membrane material barrier of gravel to facilitate heating of the plenum due to solar radiation impinging on the plenum surface.

There are several advantages to the present invention. For example, it requires no bore holes and does not require on-site power. Ideally, the present invention is employed where the depth to the localized water table is more than 20 meters, where there is low traffic and the surrounding surface is clear of complicated structures. By design, the present invention is capable of remediating volatile contaminants and concentrated source contaminants (e.g., liquid deposits) where the concentrated source extends no deeper than 6–10 meters. Illustrative uses of the present inventions include remediation of solvents, fuels, organic liquids, shallow landfill, buried waste, leaking underground storage tanks, leaking buried pipeline and surface spills.

Whereas the drawings and accompanying description have shown and described the preferred embodiment of the present invention, it should be apparent to those skilled in the art that various changes may be made in the form of the invention without affecting the scope thereof.

What I claim is:

1. A noninvasive ground surface soil remediation system for displacement of volatile earthen soil gas within a predetermined area, the system comprising:
   a. a vent assembly having a first end and a second end, the vent assembly further comprising a means for unidirectionally releasing soil gas securely coupled therein;
   b. a surface seal securely coupled to the vent assembly first end in a gas-tight relationship, the surface seal being deposited over a predetermined area of earthen soil; and
   c. a collection plenum manifold formed between an earthen surface and the surface seal, wherein under natural variable atmospheric forces, the system controls net upward movement of volatile soil gas to thereby direct such volatile gas towards and out the vent assembly for release into the above-ground atmosphere.

2. The system according to claim 1, wherein the surface seal is a flexible, continuous, non-porous sheet extending outward from the plenum a predetermined radial distance to induce below-surface soil gas to flow in a direction towards the collection plenum.

3. The system according to claim 2, wherein a buffer zone is formed in the earthen soil, the buffer zone being the earthen soil area bounded approximately between an edge of the surface seal and a border of the collection plenum.

4. The system according to claim 2, wherein the predetermined area is an area including the earthen soil of the buffer zone and the earthen soil below the collection plenum volume.

5. The system according to claim 2, wherein the surface seal is constructed of material selected from the group consisting of polyethylene and rubber.

6. The system according to claim 2, further including a retention layer placed over the surface seal to minimize damage to the surface from abrasion or exposure to environmental elements.

7. The system according to claim 6, wherein the retention layer comprises gravel at least three inches thick in height.

8. The system according to claim 2, further including a shallow trench displaced in the earthen soil adjacent to an interior periphery of the surface seal, the trench being formed prior to emplacement of the surface seal to anchor the seal.

9. The system according to claim 1, wherein the plenum is constructed of material having a high degree of gas permeability compared to the soil upon which the plenum is placed.

10. The system according to claim 1, wherein the plenum radius is at least as large as the radius of the expected contaminant source radius to capture a substantial amount of contaminated soil gas and cause such gas to flow through and out of the vent assembly.

11. The system according to claim 10, wherein the plenum radius is at least as twice as large as the radius of the expected contaminant source radius.

12. The system according to claim 10, wherein the permeability of the plenum material is at least 100 times greater than the permeability of the earthen soil.

13. The system according to claim 10, wherein the plenum material comprises gravel of approximately six to twelve inches in depth.

14. The system according to claim 10, wherein the plenum material is adapted to collect heat energy from solar radiation to induce a positive buoyant force to enhance an upward flow of earthen soil gas from the plenum towards the plenum material.

15. The system according to claim 1, wherein the vent assembly comprises a vent pipe having a first end with a first opening and a second end with a second opening, and further comprising a means for enhancing upward soil gas flow disposed adjacent to the second end.

16. The system according to claim 15, wherein the means for unidirectionally releasing soil gas is a check valve.

17. The system according to claim 16, wherein the check valve comprises a circular frame securely attached to an interior of the pipe vent and a lightweight vent valve hinged to the frame, the vent valve covering an aperture formed in the center of the frame, the check valve adapted only to open during decreasing atmospheric pressures to release displaced soil gas.

18. The system according to claim 16, wherein the check valve, when closed, is adapted to provide a gas-tight seal with the vent pipe and allow sufficient pressure to accumulate within the plenum, and when open, is adapated to release soil gas during periods of decreasing atmospheric pressures.

19. The system according to claim 16, wherein the check valve is adapted to open during periods of decreasing atmospheric pressures to unidirectionally release soil gas during periods of decreasing atmospheric pressures.

20. The system according to claim 19, wherein the check valve frame is mounted within the vent pipe at an predetermined angle $\alpha$ degrees from a vertical interior surface of the vent pipe, $\alpha$ being selected to minimize the pressure difference existing between the collection plenum and the earthen soil outside the buffer zone.

21. The system according to claim 19, wherein the operation of the check valve is dependant upon the mass of the vent valve and the angle $\alpha$.

22. The system according to claim 14, wherein the vent pipe assembly is stabilized upon the earthen soil by a means for support, the means for support coupled securely to and in gasflow communication with the pipe assembly first end.

23. The system according to claim 22 wherein the means for support includes a base joined to a plurality of legs, the legs extending outwardly from the base, each leg having at least one inlet and channel open to the vent assembly, the inlet and channel being adapted for allowing displaced soil gas residing in the collection plenum to flow through the vent assembly for release into the atmosphere.

24. The system according to claim 1, wherein the means for unidirectionally releasing soil gas is a turbine ventilator adapted to utilize naturally occurring wind forces to create an extraction vacuum in the plenum.

25. The system according to claim 22, wherein the turbine ventilator is adapted to utilize naturally occurring wind forces to create an extraction vacuum in the plenum.

26. A method for noninvasive ground surface soil remediation which enhances displacement of volatile earthen soil gas above a predetermined water table and within a predetermined buffer zone, the method comprising:

a. securely coupling a vent assembly to a surface seal;
  b. forming a collection plenum manifold between the ground surface and the surface seal;
  c. placing the surface seal over a predetermined area of earthen soil; and
  d. under natural variable atmospheric forces, causing upward movement of volatile soil gas to thereby direct such volatile gas towards the vent assembly for release into the atmosphere.

27. The method of claim 26, further including providing a buffer zone bounded by the area of approximately between an edge of the surface seal and a border of the collection plenum, the buffer zone adapted to resist rapid inflow of atmospheric gas into the earthen soil surface, the buffer zone sized to induce alteration of soil gas up to a desired depth to flow in an direction towards the collection plenum.

28. The method of claim 27, wherein the plenum radius is at least as large as the radius of the expected contaminant source radius to capture a substantial amount of contaminated soil gas and cause such gas to flow to the vent assembly.

* * * * *